Oct. 15, 1940.   T. S. WEST ET AL   2,217,780
METHOD OF ELECTRICAL GEOPHYSICAL PROSPECTING AND
APPARATUS FOR PRACTICING SAID METHOD
Filed July 26, 1937   4 Sheets-Sheet 2

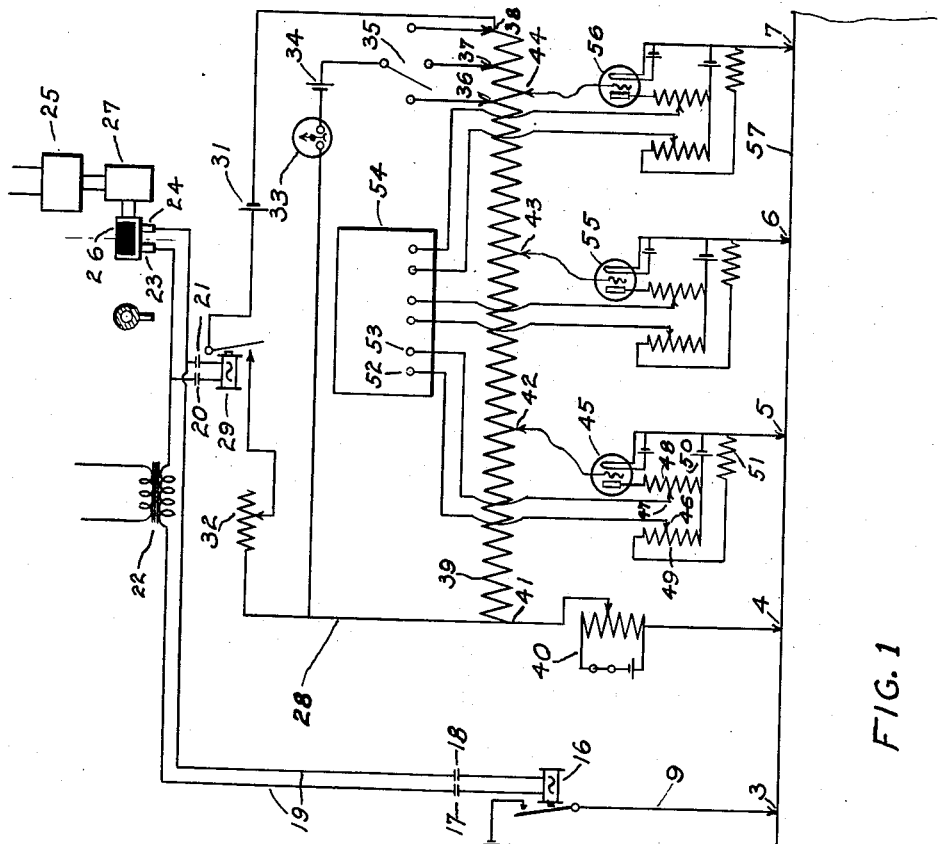

INVENTORS
Thomas S. West
Clarence C. Beacham

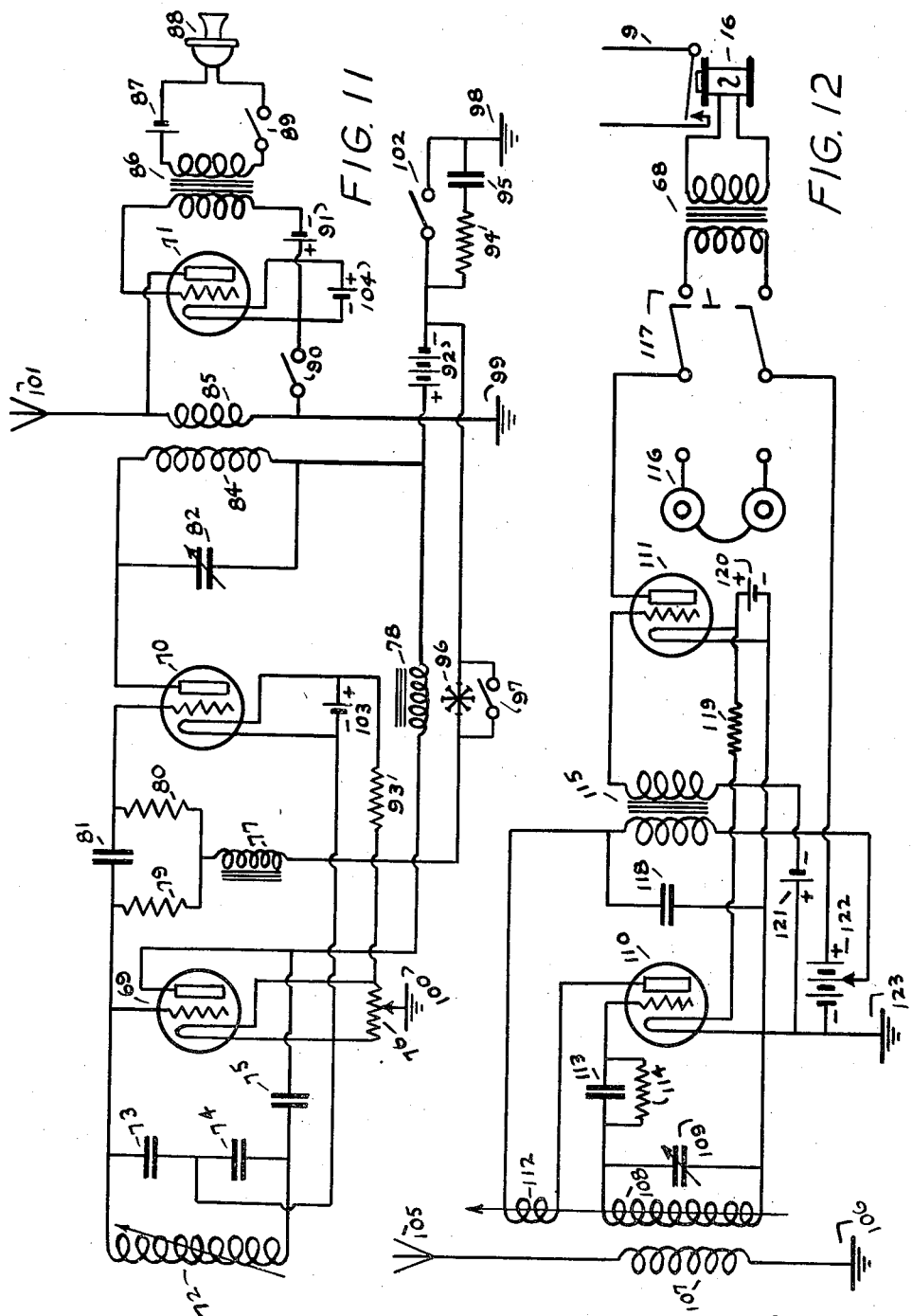

Patented Oct. 15, 1940

2,217,780

UNITED STATES PATENT OFFICE 2,217,780

METHOD OF ELECTRICAL GEOPHYSICAL PROSPECTING AND APPARATUS FOR PRACTICING SAID METHOD

Thomas S. West and Clarence C. Beacham, Lockhart, Tex.

Application July 26, 1937, Serial No. 155,680

16 Claims. (Cl. 175—182)

The object of our invention is to provide an improved method for determining the location and character of sub-surface bodies or earth portions having electrical resistivities differing from that of associated earth.

It is a further object of our invention to provide apparatus for the practicing of said method of electrical geophysical prospecting which permits both greater speed of operation and greater precision of measurement than is possible with apparatus commonly used for such measurements.

At present earth resistivities may be determined by the well known method, which basically consists of passing electric current through the earth between two spaced apart electrodes and measuring potential difference resulting from this current flow between two other spaced apart electrodes. Theoretically the variation of resistivity of the earth with depth may be determined with this method by varying the spacing between current and potential electrodes and noting variation of apparent resistivity values which may be calculated from resulting data. From the variation of apparent resistivity with variation of electrode spacing, inference may be made as to the presence or absence of, and depth to, bodies of characteristic resistivity such as earth stratum, oil or gas saturated strata, or ore bodies. In practice it is rarely possible to obtain satisfactory results with procedure described above because variations of resistivity of the earth's surface layer in the vicinity of electrodes which are moved to secure a variation of electrode spacing introduce variations in apparent resistivity values which cannot be distinguished from that due to deeper bodies or earth portions. This is particularly true if attempt is made to prospect to the depths usually necessary for location of oil or gas saturated sands or for the determination of depth to earth stratum at similar depths.

From the standpoint of deep prospecting only the variation of resistivity in the vertical direction is of interest. Although electrical prospecting methods in which resistivity values have been obtained for various spacings between electrodes, have been classified as methods of vertical exploration below a given surface position, such procedures in reality result in combined vertical and horizontal exploration because variations of resistivity in the horizontal direction, along the traverse on which electrodes are moved horizontally for varying spacing between electrodes, also influences resistivity values. The method of electrical prospecting described herein eliminates to a high degree of accuracy the influence of horizontal variations of resistivity on electrodes which are moved for obtaining a variation of electrode spacing. For this reason true vertical exploration is obtained, a result which is not only of great utility but one which has not been previously attained.

Although the method of prospecting and apparatus herein described may be used for studying the variations of resistivity of any conductor of large volume, it is primarily designed for the determination of the presence or absence of and depth to oil or gas saturated formations and determination of depth to other relatively deep stratum. It is well known to the art that a given earth stratum has higher electrical resistivity when oil or gas saturated than when water saturated. Our invention provides a means for reducing the influence of variation of resistivity of the surface layer to the extent necessary for detecting the increase in resistivity of a given formation ordinarily resulting from the change from water saturation to oil or gas saturation.

Required accuracy of measurement of potential difference is much greater than usually justified in the application of previous methods of electrical prospecting. Many factors which are negligible when prospecting to shallow depth become critical when precise measurement at great depths is attempted. Most important among these are, fluctuations of natural earth potential difference, increase in time required for current and potential difference to reach steady state values, line leakage, flow of current along conductors in the vicinity such as wire fences, and constancy of calibration of instruments.

Fluctuations of potential difference due to natural earth currents may be eliminated by use of commutating devices which simultaneously reverse direction of artificial current flow and leads to potential electrodes. Such devices, while practical for shallow depth, are not satisfactory for deep prospecting because reversals must be made with such rapidity that current and potential difference do not have time to reach steady state values and distribution. The use of alternating current is not satisfactory for the same reason. If required accuracy of measurement of potential difference is secured by averaging a large number of values for each position of electrodes which are moved to secure a variation of electrode spacing, variation of leakage between the earth and lines which connect to electrodes during the time that observations are in progress may alter the form of resulting apparent resistivity curves. Variation of leakage along wire fences and other conductors which may be present in the vicinity will also influence the form of apparent resistivity curves. For example, in prospecting to great depths the change in leakage resulting from crushing the insulation of a conductor by passage of a vehicle over it may result in a variation of observed potential difference greater than that due to a deep oil or gas sand. The variation of moisture on surfaces of wooden fence posts between early morning and afternoon may result in error of equal magnitude.

Our invention provides apparatus with which influence of fluctuation of natural earth potentials may be reduced to a negligible quantity but which also allows sufficient time for current and potential difference to reach steady state values. Our invention also provides apparatus which permits simultaneous measurement of potential difference at any desired number of points, thus avoiding the influence of leakage variation while observations are in progress. Our invention further provides apparatus and a method of prospecting which has a high degree of independence of constancy of calibration of instruments.

Our invention and its application to the measurement of earth resistivities is illustrated by accompanying drawings.

Figures 1 and 2 illustrate electrode arrangement and show a schematic wiring diagram of apparatus.

Figure 8 shows apparent resistivity curves and curves resulting after correction for resistive inhomogeneities in the vicinity of electrodes which are moved. These curves were obtained by small scale experiment and illustrate accuracy of method of correcting for resistive inhomogeneities. (The term "resistive inhomogeneities" as used herein is intended to refer to bodies or earth portions having electrical resistivity which differs from that of associated earth.)

Figure 3 is a curve illustrating the variation with time of natural earth potential difference between two spaced apart electrodes in contact with the earth. Figure 4 illustrates the variation with time of potential difference between two spaced apart electrodes in contact with the earth, which is caused to exist by the flow of electric current for a short period of time through the earth between two other spaced apart electrodes, if no natural earth potential exists.

Figure 5 is the resultant variation of potential difference between said two spaced apart electrodes if the potential difference curve shown by Figure 4 is superimposed on potential difference curve of Figure 3. Figure 5 illustrates the type of potential difference curve which may be obtained if the potential difference between two electrodes due to a flow of electric current through the earth between spaced apart electrodes occurs at the same time variations of natural earth potential difference are in progress.

Figure 11 shows radio equipment for transmitting energy for operating relay controlling current flow by radio remote control and for transmission of speech and code signals.

Figure 12 shows radio receiving equipment which is used for both operation of relay controlling current flow and speech or code reception.

Figure 3:
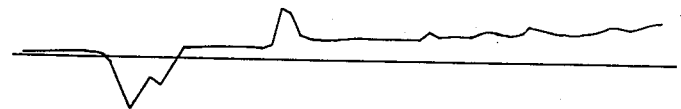
Figure 4:
Figure 5:
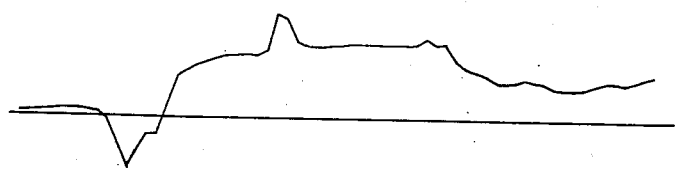
Figure 9:
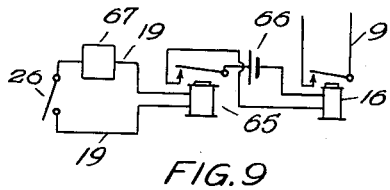
Figure 9 illustrates a combination of relays for controlling relatively large currents.

Referring to Figure 1, 1, 2, and 3 are any type of electrodes which make sufficiently low resistance and stable contact with the earth, 57. The dimensions of these electrodes are preferably as small as possible consistent with above requirements. Electrodes 4, 5, 6, and 7 are any type of electrodes suitable for potential difference measurement but are preferably of the well known non-polarizable type. 8, 9, and 10 are insulated conductors of any type suitable for making connection to electrodes 1, 2, and 3. 11 is a single pole double throw switch suitable for making alternate connection to one terminal of battery 15 and to electrodes 1 or 2. 12 is an adjustable rheostat suitable for accurately regulating flow of electric current. 14 is a recording ammeter, preferably of the well known type in which a spot of light reflected from a mirror attached to the moving element of a galvanometer is photographed on a moving film. 13 is an ammeter for indicating the value of current flow. 15 is a battery, preferably a bank of storage cells of such total capacity as necessary to cause a non-fluctuating current flow of desired magnitude through the earth between electrodes 1 and 3 or 2 and 3. The required magnitude of current is dependent on depth and resistivity of formations. For deep prospecting in low resistive formations current values ranging from 5 to 100 amperes are sometimes desirable. 16 is a relay suitable for opening and closing the circuit between battery 15 and the earth. This relay may be of any form but is preferably of the alternating current type. 16 may sometimes be advantageously composed of two relays, a sensitive one which may be operated by a small current and heavier relay or magnetic switch which is operated from sensitive relay and suitable for opening and closing circuits carrying relatively large current. Figure 9 illustrates such a relay arrangement. 65 is a sensitive relay requiring a small amount of electric energy for operation and controlling only the amount of electric energy required for operating heavier relay or magnetic switch 16. Either direct or alternating current may be employed for operating either one or both relays but it is usually preferable to operate relay connected to conductors 19 by alternating current to permit the use of condensers for preventing leakage of direct current between power source and equipment for measuring potential difference. 17, 18, 20, and 21 are condensers for preventing flow of direct current along conductors 19. 22 is a source of alternating current for operating relays 16 and 29. 26 is preferably a rotary switch or commutator suitable for alternately opening and closing the circuit through the coils of relays 16 and 29.

29 is an alternating current relay for opening and closing working current circuit of potentiometer 28. 32 is an adjustable resistance for regulating working current of 28. 33 is an indicating instrument for determining adjustment of rheostat 32 at which working current of potentiometer 28 has the magnitude required for making potential drop along potentiometer slide wire 39 between 41 and, for example, 37 equal to that of standard cell 34 which is connected in such a direction as to oppose potential difference between 41 and 37. 39 is a calibrated slide wire, or equivalent arrangement of resistances such as commonly used in potentiometer circuits. Three point switch 35 is provided for making connection between one terminal of standard cell 34 and either of points 36, 37, or 38 on calibrated slide wire 39. A convenient means is thus provided for accurately adjusting potentiometer working current to three different values. 42, 43, and 44 are adjustable contact points or other means for making contact at any desired point along slide wire 39. Arrangement of contacts and construction of slide wire 39, or equivalent circuit, is preferably such as to permit continuous variation of potential difference as sliders or contacts are moved. Potentiometer 40 is preferably arranged so as to maintain slide wire 39 at negative potential with respect to the earth thus maintaining the grids of tubes 45, 55, and 56 at approximately the desired negative potential with respect to filaments. 45, 55, and 56 are three electrode vacuum tubes or other types of tubes which may perform required functions. 48 and 49 are resistances constructed so as to permit contact to be made at any desired point by contactors 46 and 47. 50 is a radio B battery, or equivalent source of electric energy, for supplying plate current to vacuum tube 45. 51 is a resistance having magnitude approximately equal to that between filament and plate of vacuum tube 45. Connection of resistances 48, 49, and 51, vacuum tube 45, and B battery 50 is such that current from 50 divides into two branches. The plate circuit of tube 45 and resistance 48 are in one branch and resistances 49 and 51 in the other. If resistances 48 and 49 are of proper value, it will be possible to make connection between these resistances at points at which potential drop from their common terminal will be the same, and potential difference between points will be zero. 54 is a recording galvanometer arrangement of any type satisfactory for making simultaneous record of movement of moving elements of a plurality of galvanometers on a moving paper or film. Recorder 54 is preferably of the type in which light reflected from a mirror on the moving element of each galvanometer is focused on a moving photographically sensitized paper or film. It is also preferable that recorder 54 be so constructed that visual observation of the deflection of galvanometers is possible while recorder is in operation. Recorders having the above characteristics are well known to the art. 52 and 53 are the terminals for connection to one of the galvanometers of recorder 54. Other terminals shown on recorder 54 connect to similar but independent galvanometers. Circuits associated with vacuum tubes 55 and 56 are identical with that of tube 45.

The vacuum tube arrangement in circuit between electrode 5 and contact 42 is essentially a resistance coupled amplifier. Any of the various well known forms of this type amplifier may be substituted for the arrangement shown. It is essential that any arrangement substituted for tube 45 and associated circuits performs required function without the flow of current between electrode 5 and contact 42. This condition is approximated with circuit shown because the flow of current between grid and filament of tube 45 will be negligible so long as the grid is maintained at the proper negative potential with respect to filament by potentiometer 40.

Figure 2 shows a balanced type two stage resistance coupled amplifier which is more stable and of greater sensitivity than the arrangement illustrated in Figure 1.

To minimize leakage between potentiometer and current circuits potentiometer and associated equipment is preferably mounted in a separate motor truck. The truck containing equipment for measurement of potential difference may be stationed near potential electrodes, and truck containing batteries and current controlling equipment stationed near current electrodes with lines 19 for operation of relays the only interconnecting conductor. Lines 19 may also be used for telephone communication between trucks.

Relays 16 and 29 may also be operated from one point by various well known methods of radio operated remote control.

Figures 11 and 12 illustrate one of such methods, Figure 11 representing a radio transmitter designed for continuous wave, interrupted continuous wave and telephone transmission, and Figure 12 representing a radio receiver which is capable of continuous wave, interrupted continuous wave, and telephone reception.

The transmitter of Figure 11 consists of three basic circuits, an oscillating, amplifying, and modulating circuit. Electrical oscillations generated by three electrode vacuum tube 69 and the oscillating circuit composed of variable inductance 72 and condensers 73 and 74, are amplified by the three electrode vacuum tube 70 and then delivered to an antenna 101 and ground 99 through an inductance 84, said inductance being shunted by a variable condenser 82 and inductively coupled to inductance 85 in the antenna and ground circuit. Voice modulation of the radiated wave may be obtained by shunting the plate and filament of a three electrode vacuum tube 71 across inductance 85, the grid and filament of said tube 71 being connected to the secondary of transformer 86, the primary of which is in turn connected to a telephone transmitter 88 and local battery 87. Additional essentials of the transmitter circuit are: direct current blocking condensers 75 and 81, grid leak resistances 79 and 80, radio frequency choke coils 77 and 78, filament shunt resistance 76 with variable intermediate tap connected to ground 100, filament heating batteries 103 and 104, a plate and grid supply battery 92, a battery 91 for maintaining grid of modulator tube 71 negative with respect to filament, a switch 89 for breaking circuit through battery 87, a switch 90 for opening modulator circuit, a resistance 94 and condenser 95 shunted around control switch 102 to reduce sparking at contacts, said switch 102 being of any convenient form such as a key, knife, push button, pull cord, or rotary, switch such as 26 of Figure 1. When switch 102 is closed the oscillator and amplifier tube filaments are connected to negative terminal of plate supply battery 92 through ground connections 98 and 100 and the tubes operate in the normal manner, a continuous wave being radiated from antenna 101 and ground 99. When switch 102 is opened plate-filament circuits of tubes 69 and 70 are opened stopping radiation from the transmitter. If interrupted continuous wave transmission is desired, a chopper 96 is operated in series with the grid connection of the oscillater and amplifier tubes. A switch 97 is provided for shunting out chopper 96 when the transmitter is operating as a continuous wave or telephone transmitter.

The radio receiver of Figure 12 is composed of a combined detector and oscillator tube 110 and an amplifying tube 111. Radiations from the transmitter of Figure 11 are picked up by antenna 105 and ground connection 106, flow through inductance 107, pass inductively to inductance 108 and are then impressed on the grid of three electrode vacuum tube 110, through grid condenser 113 and grid leak resistance 114. A variable condenser 109 is shunted across inductance 108 to obtain proper tuning of the input circuit of tube 110. Feed-back coil 112 in series with the plate circuit of tube 110 has variable inductance coupling with inductance 108. By making proper adjustments in the coupling of feed back coil 112 and inductance 108, this receiving circuit may be used as a receiver of continuous wave radiations. The grid of three electrode vacuum tube 111 is coupled to the output of tube 110 through transformer 115 and serves as an amplifying tube. By means of the double pole double throw switch 117, the output of tube 111 can be connected either to telephone receivers 116 or relay 16 through step-up transformer 68. Additional essentials of the receiver circuit are, a condenser 118 shunted across the output of tube 110, filament heating current control resistance 119, filament heating battery 120, amplifier grid, or "C" battery 121, plate of "B" battery 122 and filament ground connection 125.

To measure the difference in potential caused to exist between electrodes 4 and 5, 4 and 6, and 4 and 7, by a flow of electric current through the earth between electrodes 1 and 3 contacts 46 and 47 are adjusted with vacuum tube 45 operating until recorder galvanometers show approximately zero deflection with rotary switch 26 turned so as to open circuit through relays 29 and 16, thereby opening both the circuit supplying working current to slide wire 39 and circuit between electrodes 1 and 3. Relay 29 is then closed (manually or by appropriate shunting switch) and switch 35 closed so as to connect with point 37 on slide wire 39. Working current of potentiometer slide wire 39 is then adjusted by means of adjustable resistance 32 until indicating instrument 33 has zero deflection. Switch 35 is opened and rotary switch 26 is then turned preferably by hand until circuit through relays 29 and 16 is closed, thereby causing a flow of current through the earth between electrodes 1 and 3 and a flow of potentiometer working current through slide wire 39. Magnitude of current flow between electrodes 1 and 3 is regulated to a desired value by means of ammeter 13 and adjustable resistance 12. Contacts 42, 43, and 44 are adjusted until galvanometers of recorder 54 have approximately the same deflection when current is flowing in potentiometer 39 and between electrodes 1 and 3 as when relays 29 and 16 are open and there is no current flow in either circuit. Magnitude of working current of potentiometer 28 is then changed to a slightly different value by adjusting resistance 32 until indicating instrument 33 has zero deflection with switch 35 thrown so as to connect with calibrated potentiometer slide wire 39 at 36 (or 38). Switch 35 is then opened and motor 25 operating rotary switch 26 and driving mechanism of recorder 54 started. A record of deflection of recorder galvanometers is then obtained over a sufficient period of time to include a number of completions and interruptions of current between 1 and 3 and potentiometer working current. Working current in potentiometer 39 is then adjusted to such a value as to cause indicating instrument 33 to have zero deflection with switch 35 thrown so as to connect with 38 (or 36). Switch 35 is then opened and rotary switch 26 and recorder 54 again started, and a record of deflection of recorder galvanometers obtained over a period of time sufficient to include a number of completions and interruptions of current between 1 and 3 and potentiometer working current.

It is obvious that recorder galvanometer deflections while current is flowing between electrodes 1 and 3 will be that due to fluctuations of natural earth currents and that resulting because contacts 42, 43, and 44 are not at the proper points on slide wire 39. Since deflection of indicating instrument is approximately reduced to zero while no current is flowing between electrodes 1 and 2 (or 2 and 3) or in slide wire 39 by adjustment of contacts 46 and 47 any deflection of indicating instruments occurring when relays 16 and 29 are closed causing a flow of current between electrodes 1 and 3 (or 2 and 3) and in slide wire 39 will result because potential difference between contacts 41 and 42 is not equal and opposite to potential difference between electrodes 4 and 5. It is evident that if setting of contacts 42, 43, and 44 and magnitude of current flow between electrodes 1 and 3 remain constant that potential difference between 41 and contact 42 will equal the portion of potential difference between 4 and 5 which results from current flow between 1 and 3 for some value of working current in potentiometer 28. Likewise for some value of potentiometer working current the potential difference between electrodes 4 and 6, and 4 and 7 will equal that between 41 and 43, and 41 and 44 respectively.

Potentiometer slide wire 39 is calibrated in units of potential difference for the value of working current which flows when potentiometer is standardized by adjusting working current by resistance 32 until indicating instrument 33 has zero deflection with switch 35 thrown so as to connect with sliding contact 37, with 37 set at a potential difference value equal to that of standard cell 34. If $I_{37}$ is potentiometer working current when potentiometer is standardized with connection to contact 37 as above, $I_{36}$ is working current when potentiometer is standardized with connection to contact 36, $R_{37}$ is resistance of slide wire 39 between 41 and 37, $R_{36}$ is resistance of 39 between 41 and 36, E is potential difference of standard cell 34, and $E_{36}$ is the potential difference read from slide wire calibrations at setting of 36. According to Ohm's law the following relations exist:

$$E = I_{37}R_{37}$$
$$E_{36} = I_{37}R_{36}$$

and $$\frac{E}{E_{36}} = \frac{R_{37}}{R_{36}}$$

If potentiometer is standardized with connection to point 36: $E = I_{36}R_{36}$ consequently $$E = I_{37}R_{37} = I_{36}R_{36}$$

and $$\frac{I_{37}}{I_{36}} = \frac{R_{36}}{R_{37}} = \frac{E_{36}}{E}$$

Thus if potentiometer slide wire 39 is standardized for two different points of contact the ratio of the resulting two working currents is the inverse ratio of the two potential difference values read from corresponding slide wire calibrations. For this reason potentiometer working current may be conveniently expressed as the ratio of working current flow at which potentiometer is standardized to working current value for which potentiometer was calibrated.

Figure 6:
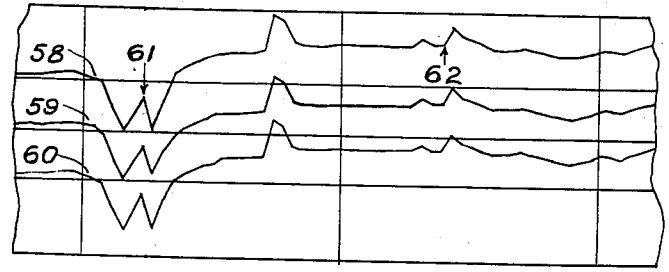
Figure 6 illustrates simultaneous records of resultant potential difference between three pairs of spaced apart electrodes.

The deflection of recording galvanometers due to current flow between 1 and 3 is determined by comparing deflection when current is flowing between 1 and 3 and in potentiometer working current circuit with that when no current is flowing in either circuit. With reference to deflection curve 58 of Figure 6, it will be noted that determination of exact potential difference is complicated by the influence of natural earth potentials. An accurate value of deflection may be obtained by averaging a sufficient amount of data. 61 indicates the point at which circuit between 1 and 3 and potentiometer working current circuit were closed and 62 indicates point at which these two circuits were opened. Because potentiometer working current circuit reaches the steady state value quicker than circuit through the earth between 1 and 3, a characteristic sharp deflection will occur at time relays 29 and 16 open or close permitting the ready identification of the periods during which current was on and off. (It is usually desirable to use a relay at 29 which has a delayed or retarded action to prevent too violent deflection of galvanometers.) When reading deflection values from records sufficient time should be allowed after circuits are closed to permit current and potential difference to approximately reach steady state value. Similarly sufficient time should be allowed after circuit is opened to permit approximate decay of currents and potential difference. Time which should be allowed for this factor may be determined directly in the field by study of records obtained at a time natural earth potentials are not fluctuating. Deflection is determined by averaging values over portion of record on which steady state conditions prevail, and subtracting average obtained when potentiometer working current circuit and circuit between 1 and 3 are open from a similar average obtained when these circuits are closed. In determining averages it is preferable to exclude portions of record on which obvious sharp fluctuations of natural earth potential occur.

Figure 7:
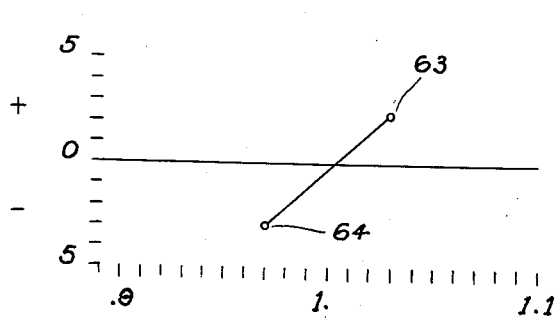
Figure 7 illustrates a graphic method of accurately determining value of potential difference from the data secured by the operation of the apparatus of Figure 1.
Figure 10:
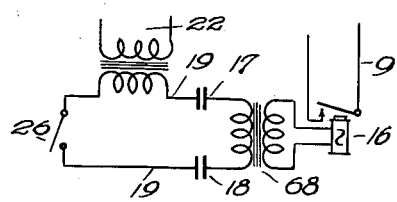
Figure 10 illustrates a transformer arrangement which may be used in some cases for increasing the efficiency of relay circuit.

Deflection is obtained in the above manner for two values of potentiometer working current, preferably one higher and one lower than that for which approximate setting of 42, 43, and 44 were initially determined. Usually potentiometer working current at which setting of 42, 43, or 44 equals the potential difference between 4 and 5, 4 and 6, or 4 and 7, which is due to current flow between 1 and 3, occurs at some intermediate value. If the characteristics of vacuum tubes 45, 55, and 56 and associated circuits (or equivalent amplifiers) are such that output plate current of these tubes (or output tube of equivalent amplifier) varies as a straight line when input grid potential varies as a straight line, two values of recorder galvanometer deflection are sufficient for determining required working current value. Figure 7 illustrates a convenient graphic method of doing this. The abscissa of the coordinate system of Figure 7 is the ratio of potentiometer 28 working current for a given deflection value to working current when potentiometer is standardized to calibrated value. The ordinate is the deflection of recorder galvanometer due to current flow between 1 and 3 as determined by averaging values on record 58 of Figure 6 in the manner previously explained. For convenience 58 may be assumed to be the record obtained between electrodes 4 and 5 of Figure 1. 63 is the deflection thus determined with potentiometer working current too high and 64 is similar deflection with working current too low. If 63 and 64 are joined by a straight line the point at which this line intersects the zero deflection line will be the working current value for which potential difference between 41 and 42 equals the portion of potential difference between 4 and 5 due to a flow of current between 1 and 3. By multiplying the potential value read from calibrations of slide wire 39 corresponding to the setting of 42 by the working current ratio at which zero deflection is indicated the true value of potential difference existing between electrodes 4 and 5 due to a given current flow between electrodes 1 and 3 may be determined. Similarly by reading deflection from curves 59 and 60, which are assumed to be obtained between electrodes 4 and 6 and 4 and 7, potential difference between these electrodes may be determined.

If vacuum tube circuit on which recorder galvanometer is operated does not have straight line characteristics, the point of zero deflection may be obtained by determining additional values such as 63 and 64 of Figure 7 and determination of the point at which resulting curve intersects the zero axis.

The potential difference between 4 and 5, and 4 and 6 due to a given current flowing between 1 and 3 may be determined in a manner somewhat similar to the above if deflection is determined for two different values of current flow between 1 and 3 while working current of potentiometer 28 is maintained at a constant value. With a given current flowing between 1 and 3 contacts 42 and 43 and 44 are set so as to approximately bring the portion of deflection of recorder galvanometers due to this current flow to zero. Current between 1 and 3 is then adjusted to both a higher and a lower value than initially. Deflection of each recorder galvanometer is then determined for each current value. The magnitude of current flow between 1 and 3 for which potential difference between 4 and 5, 4 and 6, and 4 and 7 equals that determined by the setting of contacts 42, 43 and 44 may be determined by plotting a curve similar to that of Figure 7 except that abscissa is magnitude of current flow between 1 and 3.

After potential difference between 4 and 5, 4 and 6, and 4 and 7 which results from a flow of current between 1 and 3 has been determined, the potential difference between any desired pair of potential electrodes may be calculated. For example, potential difference between 5 and 7 will be potential difference between 4 and 7 minus potential difference between 4 and 5.

Current recorder 14 is provided for determination of small departures of the current from the value to which regulation is attempted. Sensitized paper or film of recorder 14 is preferably moved at the same speed as that of recorder 54 so that accurate current value corresponding to any given deflection of recorder galvanometer may be determined.

Potential difference due to natural earth currents may vary with most any degree of rapidity with time. These potential differences may roughly be divided into two classes, those producing sharp variations of potential difference which extend over a relatively short period of time, and those which are relatively slow and which may have relatively uniform variation over a considerable period of time. Natural earth currents are ordinarily of distant origin and consequently equipotential lines which are set up on the earth's surface and perpendicular to direction of current flow are approximately straight lines, except for the influence of local resistive inhomogeneities, over the distance covered by potential electrode system. For this reason potential difference due to natural earth currents will tend to influence all pairs of potential electrodes similarly. The magnitude of fluctuations will vary with the resistivity of the surface layer and from the influence of resistive inhomogeneities in the vicinity of potential electrodes, but the form of fluctuations will be similar for the various pairs of potential electrodes. Ordinarily magnitude of potential difference due to natural earth currents will be approximately equal for all potential electrode pairs in a given area. If only simultaneous values of recorder galvanometer deflections are used for determining deflection due to a given current flow, small errors which may result because of natural earth current fluctuations will tend to compensate.

It is evident that potential difference may be simultaneously measured between any desired number of pairs of electrodes by increase in proportion and duplication of described elements.

Figure 8:
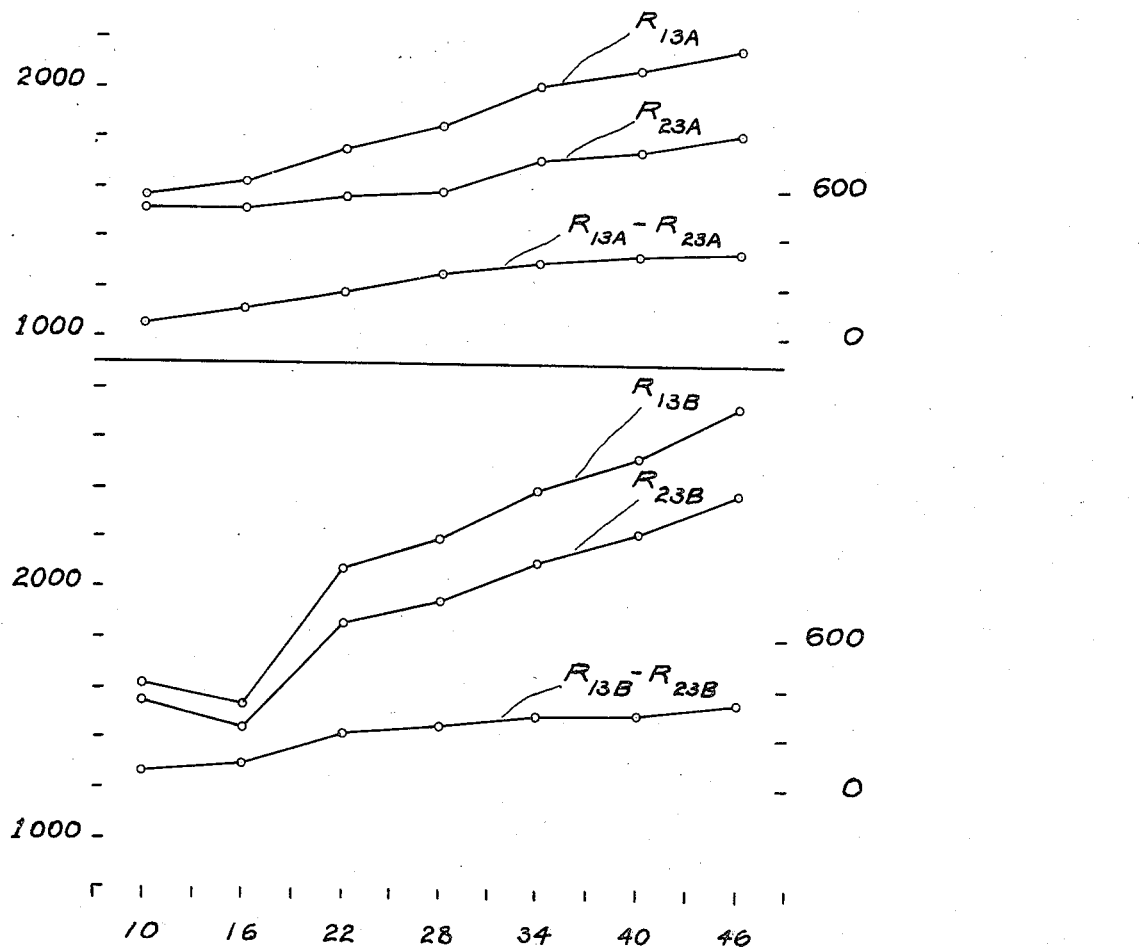

For description of the manner in which correction is made for shallow inhomogeneities by use of our invention reference is made to Figures 1 and 8. Switch 11 is first thrown so as to connect with electrode 1. Measurement of the potential difference caused by a current flow through the earth between electrodes 1 and 3 is then made between two spaced apart potential electrodes such as 4 and 7. Switch 11 is then thrown so as to connect with electrode 2 and a measurement of potential difference made for current flow between electrodes 2 and 3 for the same position of potential electrodes 4 and 7 as for above flow of current between electrodes 1 and 3. Electrodes 4 and 7 are then moved so as to vary the distance between 4 and 7 and 2 and 3. By means of the above procedure separate measurement of the potential difference caused to exist between these electrodes by flow of current between 1 and 3 and 2 and 3 is made for the new position of potential electrodes 4 and 7. This process may be continued until potential difference measurements for flow of current between 1 and 3 and 2 and 3 is made for any desired number of positions of potential electrodes. The magnitude of current flow between 1 and 3 and 2 and 3 is preferably adjusted to the same value through a given series of potential difference measurements. It is also preferable that magnitude of current be maintained constant while observations for determining deflection are in progress.

It is evident that above required measurements of potential difference may be made simultaneously for all or a portion of the various positions of potential electrodes by use of the equipment shown in Figure 1. By following the procedure of measurement previously described herein, measurement of potential difference due to current flow between 1 and 3 may be made simultaneously for desired pairs of potential electrodes 4, 5, 6, and 7 or by use of additional equipment, for any desired number of potential electrodes. In similar manner measurement of potential difference may be made for the same positions of potential electrodes 4, 5, 6, and 7 with current flowing between 2 and 3.

The spacing between various electrodes is not critical and may be varied within rather wide limits. It is usually satisfactory to have distance between 1 and 2 equal or greater than the maximum depth to which prospecting is desired. The spacing between 2 and 3 may be about one-seventh of the maximum depth, and spacing between potential electrodes an equal amount. Potential electrodes are preferably moved by small increments. It is satisfactory but not essential to maintain spacing between potential electrodes constant throughout the usual range of curves. Where apparatus shown in Figure 1 is employed for taking simultaneous measurement of potential difference between a number of potential electrodes the distances between 4 and 5, 5 and 6, and 6 and 7 are preferably made equal to the increment with which variation of electrode spacing is desired.

Potential electrodes are preferably but not necessarily placed along the line determined by electrodes 2 and 3. Electrode 1 may be placed at any desired position so long as it is sufficiently remote and not in the vicinity of potential electrodes.

If current, distances between electrodes, and potential difference are measured, the apparent resistivity value may be calculated for each position of potential electrodes and for current flow between both 1 and 3 and 2 and 3. For the electrode arrangement shown in Figure 1, with current flow between electrodes 1 and 3 and potential difference measurement between electrodes 4 and 7, the formula for calculating apparent resistivity is the following:

$$R_{13} = \frac{2\pi E_{13}}{I\left(\frac{1}{C} - \frac{1}{D+C} + \frac{1}{D+C+B+A} - \frac{1}{C+B+A}\right)}$$

and for current flow between electrodes 2 and 3

$$R_{23} = \frac{2\pi E_{23}}{I\left(\frac{1}{C} - \frac{1}{B+C} - \frac{1}{C+D} + \frac{1}{B+C+D}\right)}$$

In these formulas A is the distance between electrodes 1 and 2, B the distance between electrodes 2 and 3, C the distance between electrodes 3 and 4, and D the distance between electrodes 4 and 7. $E_{13}$ and $E_{23}$ is the potential difference between electrodes 4 and 7 due to the flow of electric current I between electrodes 1 and 3 and 2 and 3 respectively. If current is in amperes, potential difference in volts, and distances in centimeters, $R_{13}$ and $R_{23}$ will be expressed as ohms per centimeter cube. The derivation of apparent resistivity formulas is well known to the art.

It is well established that earth apparent resistivity values are significantly influenced by subsurface earth portions or strata having electrical resistivity differing from that of associated formations. It is also well established that a relation exists between electrode separation and the influence of a stratum at a given depth. Thus if electrodes 2 and 3 are relatively close together, the influence of deep strata on the potential difference measured between electrodes 4 and 7 will be considerably less than that obtained when spacing of electrodes is large such as 1 and 3. The influence of shallow resistive inhomogeneities on the potential difference measured between electrodes 4 and 7 is determined principally by the proximity of these electrodes to the inhomogeneity. Consequently, the influence of inhomogeneities in the vicinity of 4 and 7 will have approximately the same effect on apparent resistivity values with current flowing between 1 and 3 as for current flow between 2 and 3. If the apparent resistivity value for current flow between 2 and 3 is subtracted from the apparent resistivity value for current flow between 1 and 3, the influence of inhomogeneities in the vicinity of 4 and 7 will be approximately eliminated while the influence of deeper layers will only be slightly diminished. The depth of prospecting is further regulated by varying the distance between potential and current electrodes.

Figure 8 illustrates by small scale experimental data the accuracy with which inhomogeneities in the vicinity of potential electrodes are eliminated. Data from which curves of Figure 8 were calculated were obtained in a test pond in which the electrode system was suspended in water permitting the insertion of bodies beneath electrode system without disturbing other conditions. The abscissa of apparent resistivity curves of Figure 8 is the distance in centimeters between current electrode 3 and the nearest potential electrode of the pair between which potential difference is measured for calculation of the corresponding apparent resistivity value. For example, the distance between electrodes 3 and 5 of Figure 1 if potential difference value used for apparent resistivity calculation is between 5 and 7. The ordinate of curves of Figure 8 are apparent resistivity values in ohms per centimeter cube. Curves $R_{13A}$ and $R_{23A}$ are apparent resistivity curves obtained with approximately homogeneous conditions in the vicinity of potential electrodes. $R_{13A}-R_{23A}$ is the curve resulting when $R_{23A}$ is subtracted from $R_{13A}$ in the manner described for correction for resistive inhomogeneities in the vicinity of potential electrodes. $R_{13A}$ and $R_{23A}$ were obtained with current flowing between 1 and 3 and 2 and 3 respectively. It is important that values of $R_{13A}$ and $R_{23A}$ which are subtracted be obtained with the same position of the two electrodes between which potential difference is measured.

Curves $R_{13B}$ and $R_{23B}$ are apparent resistivity values obtained with electrodes at the same position and all other conditions the same as for $R_{13A}$ and $R_{23A}$, except that a sheet of material having higher electrical resistivity than the water in which electrodes are immersed has been inserted a short distance below all potential electrodes except those for which spacing is 10 and 16 centimeters. $R_{13B}-R_{23B}$ is the curve obtained by subtracting $R_{23B}$ from $R_{13B}$ in the same manner in which $R_{13A}-R_{23A}$ was obtained. It is evident by comparison of $R_{13B}-R_{23B}$ with $R_{13A}-R_{23A}$ that the influence of high resistive sheet on curve $R_{13B}-R_{23B}$ has been eliminated with a high degree of accuracy.

Experience in the field indicates that elimination of influence of resistive inhomogeneities by the above procedure is not always as complete as that indicated by curves of Figure 8. However, in most cases influence of inhomogeneities is reduced to a negligible quantity. If such is not the case additional data may be obtained at the same approximate position of current electrodes by rotating electrode system about electrode 3 as a center. It is evident that the above procedure does not eliminate or materially reduce the influence of resistive inhomogeneities in the vicinity of current electrodes. It is well known to the art, however, that the influence of such inhomogeneities is of small magnitude and varies with electrode spacing as an approximate straight line if spacing between potential and current electrodes is great in proportion to distance between current electrode and the inhomogeneity.

Experience indicates that the most practical method of interpreting apparent resistivity curves which have been corrected in the manner herein provided, such as $R_{13B}-R_{23B}$ is by comparison with similar curves obtained at points at which subsurface conditions are known. In order to obtain a preliminary idea as to the nature of influence of oil or gas sands or other desired formations field conditions may be approximately duplicated on small scale. Field data for use as a standard of comparison is preferably obtained in or adjacent to the area in which prospecting is desired. The influence of oil or gas saturation in a given sand may be obtained under field conditions by comparison of curves obtained over a known body of oil or gas saturated sand with curves obtained in the vicinity and at points at which the above sand is saturated with water.

Interpretation of curves such as $R_{13}-R_{23}$ in terms of occurrence of and depth to oil or gas saturated sands or other strata, may also be made with the aid of the various methods which have been proposed for the interpretation of apparent resistivity curves. Such methods of interpretation have in most cases been rigidly developed for very simple stratigraphy and ideal surface conditions only. Resort must be made to various empirical modifications if attempt is made to apply these methods to the complex conditions and stratigraphy usually encountered in the field.

When simultaneous measurement of resulting potential difference is made natural earth currents may conveniently be used as one of the two required distributions of electric current in the earth. It is obvious that potential difference between electrodes which are due to a flow of natural earth currents will also be influenced by inhomogeneities in the vicinity of potential electrodes. Since the source of natural earth currents will be at a relatively great distance from potential electrodes the assumption that source is equidistant from all potential electrodes is justified. By comparing magnitude of fluctuations due to natural earth potentials inhomogeneities in the vicinity of each pair of potential electrodes relative to that at the others may be determined. For example, if the magnitude of a given fluctuation of natural earth potential difference between one pair of electrodes is taken as unity, the ratio of the magnitude of the same fluctuation between other pairs of equally spaced potential electrodes will provide a factor for each pair of potential electrodes which will vary approximately with the magnitude of resistivity of surface layer and included resistive inhomogeneities. If the apparent resistivity values obtained for the same position of potential electrodes with current flowing between 1 and 3 (or similar current electrodes) is divided by the ratio obtained from earth current fluctuations in the above manner, the influence of inhomogeneities will be eliminated or greatly diminished insofar as the form of the resulting curve is concerned, while the influence of desired deep layers will not be similarly diminished. This result is obtained because inhomogeneities in the vicinity of potential electrodes will have approximately the same effect on resistivity values for all relatively great distances between potential electrodes and source of current.

Although reference is made to only two different distributions of electric current in the earth for each position of potential electrodes, it is obvious that more than two different distributions of current in the earth might be used for determining a value related to apparent resistivity which is relatively free of the influence of resistive inhomogeneities.

It is evident that data obtained by making separate measurements of potential difference between two electrodes for two or more different distributions of electric energy or electric current in the earth may be compared in a number of ways other than that herein described. It is not our intent to limit our invention to a given method of comparison of the above two potential values or other data or quantities which may be calculated therefrom. Likewise it is not our intent to limit our invention to the particular method of creating the said two or more distributions of electric current in the earth for a given position of potential electrodes.

According to the well known law of reciprocity potential and current electrodes may be interchanged without altering resulting data. For example, if current is passed through the earth between two spaced apart electrodes and potential difference is measured between two other spaced apart electrodes, the same potential difference value is obtained if current of the same magnitude is passed through the earth between the electrodes which served as potential electrodes in the above case and potential difference is measured between the former current electrodes. It is therefore our intent that appended claims involving electrode configurations include the electrode configuration resulting if current and potential electrodes are interchanged in the manner provided by the law of reciprocity, insofar as this law is applicable.

The simultaneous measurement of potential difference between a number of pairs of electrodes may be accomplished with sufficient accuracy in many cases without introduction of a compensating potential difference between amplifier input and the earth such as that provided by potentiometer 28, or this potential difference may have various values other than that of approximate compensation as described. If no compensating potential difference is utilized it is necessary that the input potential difference required to cause a given deflection of indicating instrument on output of amplifiers be known.

Various changes may be made within the scope of the appended claims in which it is desired to claim all novelty as broadly as the prior art permits.

We claim:

1. The method of vertical electrical exploration below spaced apart current electrodes employed for creating a distribution of electric current in the earth, which comprises creating at different times two of said distributions of electric current in the earth, which differ, and making simultaneous measurement of potential difference resulting from one of said distributions of electric current in the earth between each of a plurality of pairs of spaced apart grounded potential electrodes located at different distances from at least one of said current electrodes, and then for the same position of said potential electrodes making simultaneous measurement of the potential difference caused to exist between each pair of said potential electrodes by the other of the said two distributions of electric current in the earth.

2. The method of electrical prospecting according to claim 1 in which one of the said two distributions of electric current in the earth is created by flow of electric current through the earth between an electrode near the approximate location at which prospecting is desired and an electrode remote therefrom, and in which the other of the said two distributions of electric current in the earth is created by a flow of electric current through the earth between the said electrode at the approximate location at which prospecting is desired and another electrode removed therefrom, but near the approximate location at which prospecting is desired.

3. The method of electrical prospecting according to claim 1 in which for a given position of each of desired pairs of said plurality of potential electrodes, the apparent resistivity value calculated from the potential difference caused to exist therebetween by one of the said two distributions of electric current in the earth is compared with the apparent resistivity value calculated from the potential difference caused to exist therebetween by the other of the said two distributions of electric current in the earth.

4. The method of electrical prospecting according to claim 1 in which for a given position of each of desired pairs of said plurality of potential electrodes the potential difference caused to exist therebetween by one of the said two distributions of electric current in the earth is compared with the potential difference caused to exist therebetween by the other of the said two distributions of electric current in the earth.

5. The method of electrical prospecting according to claim 1 in which for a given position of each of desired pairs of said plurality of potential electrodes data obtained with one of the said two distributions of electric current in the earth is compared with data obtained with the other of the said two distributions of electric current in the earth.

6. The method of electrical prospecting according to claim 1 in which the electric current creating one of the said two distributions of electric current in the earth has known magnitude relative to the magnitude of the electric current creating the other of the said two distributions of electric current in the earth.

7. In a method of electrical prospecting in which a distribution of electric current in the earth is created by the flow of electric current through the earth between spaced apart current electrodes, and in which the potential difference due to said distribution of electric current in the earth is measured between spaced apart grounded potential electrodes at various distances from said current electrodes, the improvement which comprises making simultaneous measurement for a plurality of said potential electrodes of the potential difference caused to exist therebetween by natural earth currents, and then, for the same said plurality of potential electrodes, making measurement of the potential difference caused to exist therebetween by the said distribution of electric current in the earth.

8. Apparatus for electrical prospecting comprising a means for causing a flow of electric current through the ground, a source of known potential difference grounded at one point, means for approximate simultaneous completion and interruption of said flow of electric current through the ground, and a desired portion of the circuit supplying said source of known potential difference, means for simultaneously impressing the potential difference existing between each of a number of known portions of said source of known potential difference and a grounded electrode between the grid and filament of a thermionic vacuum tube, means for supplying electric energy for the operation of said thermionic vacuum tubes, indicating instruments operative from the plate circuits of said thermionic vacuum tubes, and a means for making simultaneous record of the deflection of said indicating instruments for a desired period of time.

9. Apparatus for electrical prospecting comprising a means for causing a flow of electric current through the ground, a source of potential difference grounded at one point, means for approximate simultaneous completion and interruption of said flow of electric current through the ground and a desired portion of the circuit supplying said source of potential difference, means for simultaneously impressing the potential difference existing between each of a number of known portions of said source of potential difference and a grounded electrode between the grid and filament of a thermionic vacuum tube, means for supplying electric energy for the operation of said thermionic vacuum tubes, indicating instruments operative from the plate circuits of said thermionic vacuum tubes, compensating sources of potential difference adjustably connected to said indicating instruments in such a manner as to permit reducing the deflection of each to zero, and a means for making simultaneous record of the deflection of said indicating instruments for a desired period of time.

10. Apparatus for electrical prospecting comprising a means for causing a flow of electric current through the ground, a source of potential difference grounded at one point, means for approximate simultaneous completion and interruption of said flow of electric current through the ground and a desired portion of the circuit supplying said source of potential difference, means for simultaneously impressing the potential difference existing between each of a number of known portions of said source of potential difference on the input circuit of an amplifier, means for supplying electric energy for operation of said amplifiers, indicating instruments operative from the output circuits of said amplifiers, sources of compensating potential difference adjustably connected to said amplifier and indicating instrument circuits in such a manner as to permit reducing the deflection of each indicating instrument to zero, and means for making simultaneous record of the deflection of said indicating instruments for a desired period of time.

11. Apparatus for electrical prospecting comprising a means for causing a flow of electric current of a desired magnitude through the ground, a calibrated source of potential difference grounded at one point, means for altering the magnitude of said calibrated source of potential difference by known amounts, means for approximate simultaneous completion and interruption of said flow of electric current through the ground and a desired portion of the circuit supplying said calibrated source of potential difference, means for simultaneously impressing the potential difference existing between each of a number of known portions of said calibrated source of potential difference and a grounded electrode between the grid and filament of a thermionic vacuum tube, means for supplying electric energy for operation of said thermionic vacuum tubes including a means for maintaining the grids of said thermionic vacuum tubes at a desired potential, indicating instruments operative from the plate circuits of each of said thermionic vacuum tubes, compensating sources of potential difference adjustably connected to said indicating instrument and plate circuits in such a manner as to permit reducing the deflection of each indicating instrument to zero, and a means for making simultaneous record of the deflection of said indicating instruments for a desired period of time.

12. Apparatus for electrical prospecting comprising a means for causing a flow of electric current of a desired magnitude through the ground, a calibrated source of potential difference grounded at one point through an adjustable source of potential difference, means for altering the magnitude of said calibrated source of potential difference by known amounts, means for approximate simultaneous completion and interruption of said flow of electric current through the ground and a desired portion of the circuit supplying said calibrated source of potential difference, means for simultaneously impressing the potential difference existing between each of a number of known portions of said calibrated source of potential difference and a grounded electrode on the input of an amplifier, means for supplying electric energy for the operation of said amplifiers, indicating instruments operative from the the output circuits of each of said amplifiers, compensating sources of potential difference adjustably connected to said indicating instrument and amplifier circuit in such a manner as to permit reducing the deflection of each indicating instrument to zero, and a means for making simultaneous record of the deflection of said indicating instruments for a desired period of time.

13. Apparatus for electrical prospecting comprising a source of potential difference grounded at one point, means for simultaneously impressing the potential difference existing between each of a number of know portions of said source of potential difference and a grounded electrode between the grid and filament of a thermionic vacuum tube, means for supplying electric energy for operation of said thermionic vacuum tubes, indicating instruments operative from the plate circuits of each of said thermionic vacuum tubes, compensating sources of potential difference adjustably connected to said indicating instrument and plate circuits in such a manner as to permit reducing deflection of each indicating instrument to zero, and a means for making simultaneous record of deflection of said indicating instruments for a desired period of time.

14. The method of vertical electrical exploration below spaced apart current electrodes employed for creating a distribution of electric current in the earth which comprises creating at different times by means of non-coincident current electrode arrangements two different distributions of electric current in the earth and making measurement of potential difference resulting from each of said distributions of electric current in the earth, between spaced apart grounded potential electrodes located at each of a desired number of positions having different distances from at least one of said current electrodes by making, at each position of said potential electrodes, measurement of the potential difference caused to exist therebetween by one of the said two distributions of electric current in the earth and then without substantially disturbing the contact between either of said potential electrodes and the earth, making measurement of the potential difference caused to exist therebetween by the other of the said two distributions of electric current in the earth.

15. The method of vertical electrical exploration below spaced apart current electrodes employed for creating a distribution of electric current in the earth, which comprises creating, at different times, by means of non-coincident current electrode arrangements, two different distributions of electric current in the earth and making simultaneous measurement of potential difference resulting from one of said distributions of electric current in the earth between each of a plurality of pairs of spaced apart grounded potential electrodes located at different distances from at least one of said current electrodes and then, for the same position of said potential electrodes, making simultaneous measurement of the potential difference caused to exist between each pair of said potential electrodes by the other of the said two distributions of electric current in the earth.

16. In a method of electrical exploration of the subsurface in which measurements are taken, during the passage of an electric current through the earth, of a quantity which is influenced by said current and by inhomogeneities in the subsurface, the steps which comprise: taking a primary series of measurements of said quantity at different positions within a region to be explored, while passing an electric current through the earth in said region in such a manner that the measurements so obtained are influenced by inhomogeneities at different depths in said region and also by relatively near-surface inhomogeneities at said different positions, and taking an auxiliary series of measurements of said quantity at said different positions, while passing an electric current through the earth in said region in such manner that the measurements so obtained are primarily indicative of relatively near-surface inhomogeneities at said different positions, whereby the measurements of the primary series may be corrected for the effects due to relatively near-surface inhomogeneities at said different positions, as determined by the measurements of said auxiliary series, to provide a corrected series of values indicative of inhomogeneities at different depths in said region.

THOMAS S. WEST.
CLARENCE C. BEACHAM.